United States Patent [19]

Uno et al.

[11] 4,201,462
[45] May 6, 1980

[54] LENS BARREL HAVING AN APERTURE INFORMATION TRANSMISSION SECTION

[75] Inventors: Naoyuki Uno, Urawa; Fumio Urano, Omiya; Eiichi Tano, Asaka; Hiroshi Kurei, Kawagod, all of Japan

[73] Assignee: Asahi Kogaku Kogyo Kabushiki Kaisha, Tokyo, Japan

[21] Appl. No.: 915,621

[22] Filed: Jun. 14, 1978

[30] Foreign Application Priority Data

Jun. 16, 1977 [JP] Japan .................................. 52-71217

[51] Int. Cl.² ........................ G03B 17/00; G03B 9/02; G03B 17/20
[52] U.S. Cl. ..................................... 354/289; 354/53; 354/273
[58] Field of Search ................. 354/286, 289, 273, 53, 354/57, 46, 23

[56] References Cited

U.S. PATENT DOCUMENTS

| | | | |
|---|---|---|---|
| 3,683,765 | 8/1972 | Iura | 354/46 |
| 3,928,858 | 12/1975 | Sakurada et al. | 354/23 D |
| 4,089,010 | 5/1978 | Ito et al. | 354/289 X |
| 4,101,917 | 7/1978 | Ueda et al. | 354/273 |
| 4,104,649 | 8/1978 | Tanaka et al. | 354/289 |
| 4,118,726 | 10/1978 | Kuramoto et al. | 354/289 |

Primary Examiner—Donald A. Griffin
Attorney, Agent, or Firm—Sughrue, Rothwell, Mion, Zinn and Macpeak

[57] ABSTRACT

Full and minimum aperture information is transmitted to a camera body from an interchangeable lens by coding possible combinations of the two values into various discrete single values and transmitting the single value to a decoder in the camera body. For instance, a projection may be provided on the lens barrel having a height corresponding to a particular combination of full and minimum aperture values.

7 Claims, 4 Drawing Figures

| CODE | MINIMUM APERTURE VALUE | FULL-APERTURE VALUE | P1 | P2 | P3 |
|---|---|---|---|---|---|
| A | 22 | 1.4 | H | H | H |
| B |  | 2 | H | L | H |
| C |  | 2.8 | L | H | H |
| D |  | 4 | L | L | H |
| E | 32 | 4 | L | L | L |
| F |  | 2.8 | L | H | L |
| G |  | 2 | H | L | L |

LENS BARREL HAVING AN APERTURE INFORMATION TRANSMISSION SECTION

BACKGROUND OF THE INVENTION

With an interchangeable lens type camera, if information on the full-aperture value and minimum-aperture value of each interchangeable lens can be transmitted to the camera body, it is convenient for the photographer. If this is possible, for instance the full-aperture value and minimum-aperture value of a lens coupled to the camera body can be displayed in the finder. In light metering with a shutter priority type automatic exposure camera, although a lens having a full-aperture value f 4 is coupled to the camera body, sometimes an indication (for instance f 2) brighter than that is made. If a photographing operation is carried out in this state, an exposure error is caused. Therefore, in this case it is necesary to provide a warning means or to transmit the full-aperture value information from the lens to the camera body. The same is true of the minimum-aperture value. However, there is no relationship between the full-aperture value and the minimum-aperture value of a lens and, therefore, heretofore such aperture information transmitting means are formed independently of one another. Furthermore, since there are a number of full-aperture values and minimum-aperture values available, most of the aperture information transmitting means are so designed as to transmit information on the full-aperture value only which is essential for compensation of light metering; that is, they are not so designed as to transmit information on the minimum-aperture value.

SUMMARY OF THE INVENTION

Accordingly, an object of this invention is to provide a means in which two pieces of information on a full-aperture value and a minimum-aperture value are transmitted to a camera body by means of only one aperture information transmitting member provided in a lens barrel. This can be accomplished, for instance, by determining several possible full and minimum aperture value combinations, assigning a discrete value to each combination, and providing a projection on the lens barrel having a height corresponding to a particular value. The camera body includes a detector for determining the proper values from the height of the projection when the lens is mounted.

DETAILED DESCRIPTION OF THE INVENTION

This invention will now be described with reference to its preferred embodiment.

Figures 1, 2:
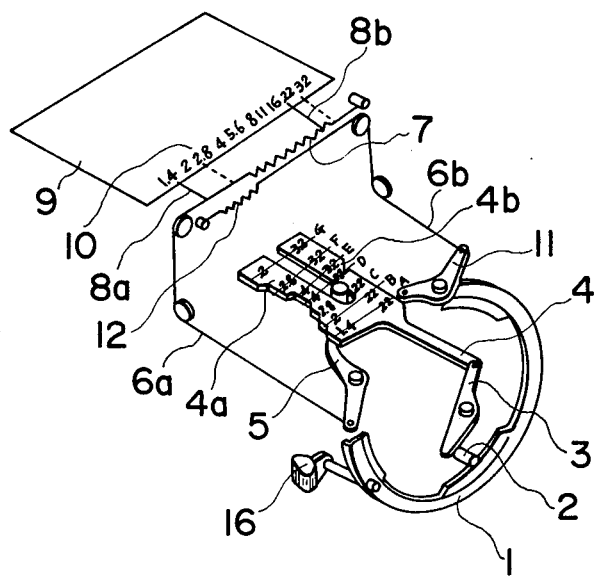
FIG. 1 is a perspective view showing an embodiment of this invention.
FIG. 2 is a Table indicating the combinations of full-aperture values and minimum-aperture values.

In FIG. 1, reference numeral 1 designates a camera mounting; reference numeral 2, a transmission pin; reference numeral 3, a link lever; and reference numeral 4, a slide lever. The slide lever 4 is provided with a full-aperture value cam 4a for the full-aperture value and a minimum-aperture value cam 4b for the minimum aperture value. A first opening lever 5 as a follower is in contact with the full-aperture value cam 4a. One end of a string 6a is tied to one end of the lever 5, and a restoring spring 7 is connected to the other end of the string 6a. A pointer 8a indicating the full-aperture value is fixedly secured to the string 6a in such a manner as to correspond to aperture value indicating numbers 10 in a finder picture frame 9. On the other hand, a second operating lever 11 employed as a follower is brought into contact with the minimum-aperture value cam 4b by a restoring spring 12. Similarly as in the case of the aforementioned full-aperture value indicating means, a pointer 8b is fixedly secured to the string 6b in such a manner as to correspond to the aperture value indicating numbers 10. In FIG. 2, reference number 16 designates a mounting lock pin. The cams 4a and 4b are in certain relation to each other which is defined by codes A through G as indicated in FIG. 2, for instance. The codes A through G mean the combinations of full-aperture values and minimum aperture values of interchangeable lenses as indicated in FIG. 2.

Figure 3:
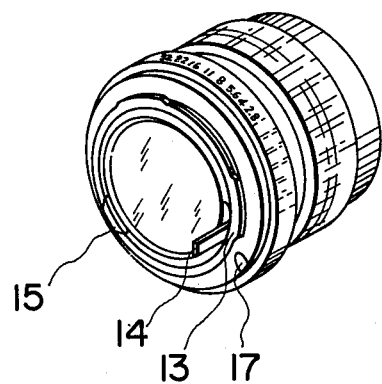
FIG. 3 is a perspective view illustrating a lens barrel.

A lens barrel is shown in FIG. 3, which comprises a lens mounting 13, an aperture operating member 14, and an aperture value relating protrusion 15. The height of the protrusion 15 is so determined that the combination of the full-aperture value and minimum-aperture value of the lens coincides with one of the combinations or codes A through G. In FIG. 3, reference numberal 17 designates a mounting lock groove.

For instance, the height of the protrusion 15 for a lens having a full-aperture value f 2.8 and a minimum-aperture value f 32 corresponds to code F. When this lens is mounted in the body in such a manner that the lock groove 17 is engaged with the mounting lock pin 16, the transmission pin 2 is depressed by the protrusion 15, as a result of which the slide lever 4 is displaced right in FIG. 1 by means of the lever 3. The amount of this displacement is so determined in advance that the cam followers of the first and second operating levers 5 and 11 coincide with the F position of the cam of the slide lever 4. Accordingly, the first operating lever 5 engages the position f 2.8 of the full-aperture value cam 4a, and the string 6a is moved to allow the pointer 8a to indicate "f 2.8". On the other hand, the second operating lever 11 engages the position f 32 of the minimum-aperture value cam 4b, and the string 6b is moved to cause the point 8b to indicate "f 32".

Figure 4:
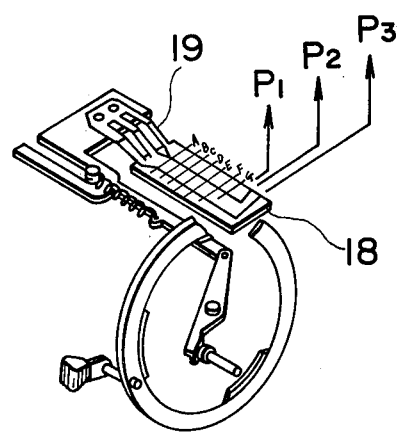
FIG. 4 is also a perspective view showing an electrical means for electrical division of a full-aperture value and a minimum-aperture value.

In the above description, one piece of input information is mechanically divided into two pieces of information representative of the full-aperture and the minimum aperture. One example of a method in which such division is electrically effected will be briefly described. In this method, each of the codes A through G is digitally processed into a 3-bit code. More specifically, the full-aperture values are represented by $P_1$ and $P_2$ including a logical high level ("H") and a logical low level ("L"), while the minimum-aperture values are represented by $P_3$ including the logical high level and the logical low level, as indicated in FIG. 2. A pattern 18 indicating the high and low levels for $P_1$, $P_2$ and $P_3$ is provided so as to coincide with the codes A through G. A desired one out of the codes A through G can be picked up by using a slider 19, thus electrically dividing the code into a full-aperture value and a minimum-aperture value (FIG. 4). Furthermore, if data representative of the combinations of full-aperture values and minimum-aperture values are replaced by electrical data such as electrical resistances which are provided for a lens barrel, it is possible to electrically detect aperture values in the camera body.

As is apparent from the above description, according to the invention, the inherent data of interchangeable lenses are determined by combining the full-aperture values and minimum-aperture values thereof, respectively, and the aperture value information transmission member corresponding to the inherent data is provided in the lens barrel, while the signal detecting member for detecting the signal from the aperture value transmission member is provided in the camera body. Therefore, two pieces of information on the full-aperture value and minimum-aperture value of an interchangeable lens can be transmitted with only one information transmission member. Accordingly, the mechanism for information transmission is simple, which leads to reduction in manufacturing cost and to improvement in reliability. Thus, the invention has significant advantages.

What is claimed is:

1. In a camera having an interchangeable lens barrel with full and minimum aperture values and means for transmitting said aperture values as aperture information to said camera body from said lens barrel, the improvement comprising:
   a single transmitting member on said lens barrel for providing both full aperture and minimum aperture information; and
   detecting means on said camera body for receiving said information when said lens barrel is mounted on said camera body.

2. A camera according to claim 1, wherein said transmitting member is a protrusion on said lens barrel having a dimension corresponding to a unique combination at full and minimum aperture values.

3. A camera according to claim 2, wherein said detecting means senses said dimension of said protrusion and mechanically actuates a display means for displaying both said full and minimum aperture values in a camera finder.

4. A camera according to claim 3, wherein said detecting means comprises:
   a camming member having first and second camming surfaces and slidable in said camera by an amount corresponding to the height of said protrusion; and
   first and second cam followers for contacting said first and second camming surfaces and controlling said display means, said first camming surface providing a minimum aperture value indication and said second camming surface providing a full aperture value indication.

5. A camera according to claim 2, wherein said detecting means senses said dimension and electrically actuates a display for displaying both said full and minimum aperture values in a camera finder.

6. A camera according to claims 2, 3 or 5, wherein the height of said protrusion is indicative of both full and minimum aperture values.

7. A camera according to claim 5, wherein said detecting means comprises:
   electrical contact means; and
   a coded member carrying a plurality of discrete codes each corresponding to a unique combination of full and minimum aperture values, at least one of said contact means and said coded member being slidable by an amount corresponding to the height of said protrusion so that said contact means contacts a particular discrete code indicating the aperture information of the lens barrel.

* * * * *